United States Patent [19]

Martinelli et al.

[11] 4,294,640
[45] Oct. 13, 1981

[54] FORMING PROCESS FOR LIGHT GAUGE POLYMER SHEET MATERIAL

[75] Inventors: Lawrence G. Martinelli, San Jose; Mark R. Garrison, Santa Clara, both of Calif.

[73] Assignee: Verbatim Corporation, Sunnyvale, Calif.

[21] Appl. No.: 102,777

[22] Filed: Dec. 12, 1979

[51] Int. Cl.³ .................... B29C 17/04; B29F 1/10; B29C 3/00; B65D 85/30
[52] U.S. Cl. ........................... 156/213; 264/503; 264/516; 264/299; 206/444
[58] Field of Search .................. 156/216, 213, 212; 264/503, 512, 516, 545, 549, 292, 234, 299; 206/311, 312, 313, 387, 444; 220/339, 341; 223/37; 270/68 R; 38/73; 93/61 R, 84 R

[56] References Cited

U.S. PATENT DOCUMENTS

| 2,373,093 | 4/1945 | Baker | 264/346 |
|---|---|---|---|
| 2,952,042 | 9/1960 | Garsson | 264/346 |
| 3,200,182 | 8/1965 | Hechelhammer | 264/234 |
| 3,383,375 | 5/1968 | van der Vegt et al. | 264/346 |
| 3,555,135 | 1/1971 | Paul | 264/346 |
| 3,752,723 | 8/1973 | Bruneau | 156/324 |
| 3,864,755 | 2/1975 | Hargis | 206/387 |
| 3,932,895 | 1/1976 | Ward | 206/312 |
| 3,977,932 | 8/1976 | Fries et al. | 156/216 |
| 4,038,693 | 7/1977 | Huffine et al. | 206/444 |

FOREIGN PATENT DOCUMENTS 800513  8/1958  United Kingdom .............. 206/313

OTHER PUBLICATIONS

G.E. Technical Marketing-Sheet Products-Primer (pp. 1–28).

Primary Examiner—William A. Powell
Assistant Examiner—Louis Falasco
Attorney, Agent, or Firm—Thomas E. Schatzel

[57] ABSTRACT

A method for cold-forming light gauge polymer sheet material by application of localized heat to the area of the fold. In the manufacture of Lexan polycarbonate flexible magnetic disk jackets, heat is applied to the folded corner by a heater bar generally maintained uniformly at 375° F. The heater bar contacts the folded Lexan polycarbonate edge in a U-shaped trough having planar side walls generally perpendicular to a planar bottom wall.

5 Claims, 7 Drawing Figures

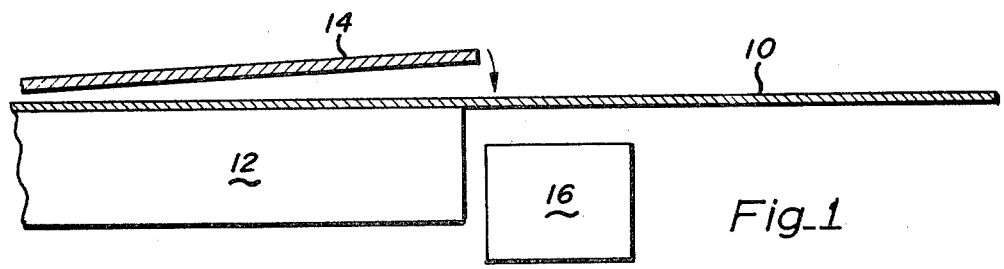
Fig_1
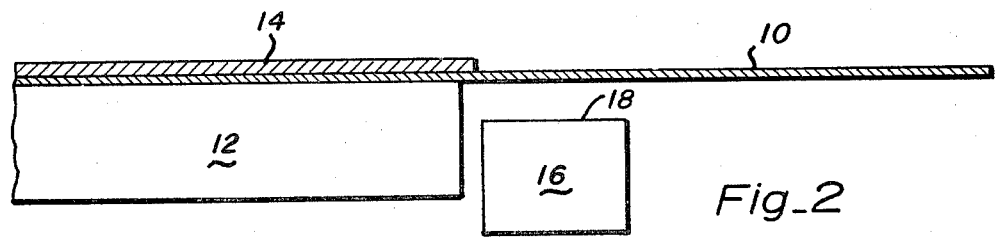
Fig_2
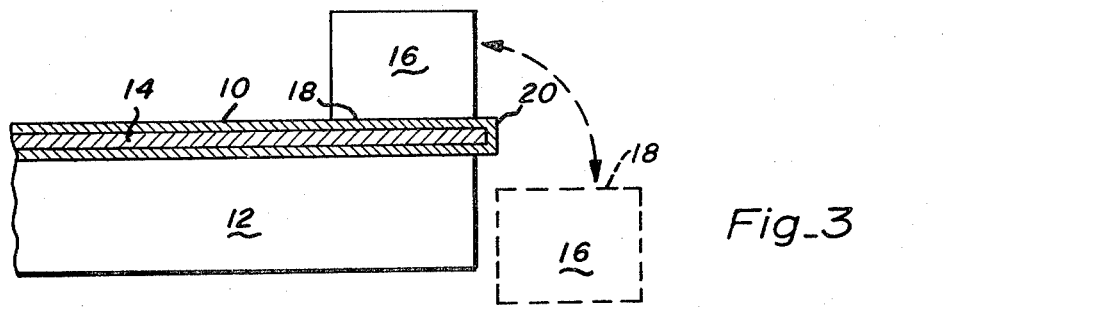
Fig_3
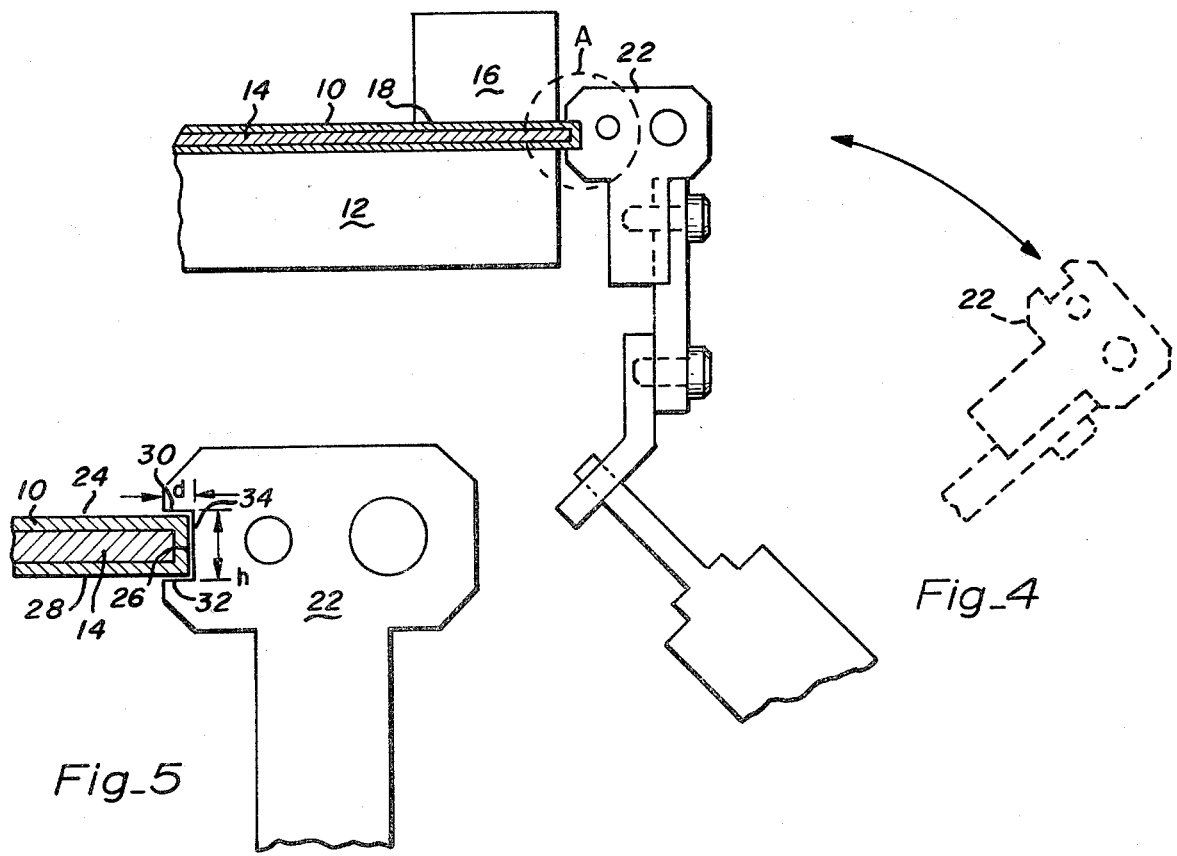
Fig_4
Fig_5

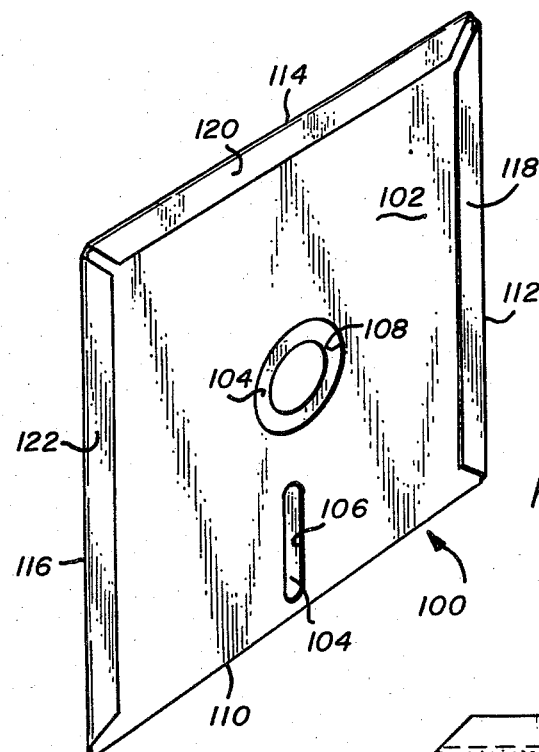
Fig_6
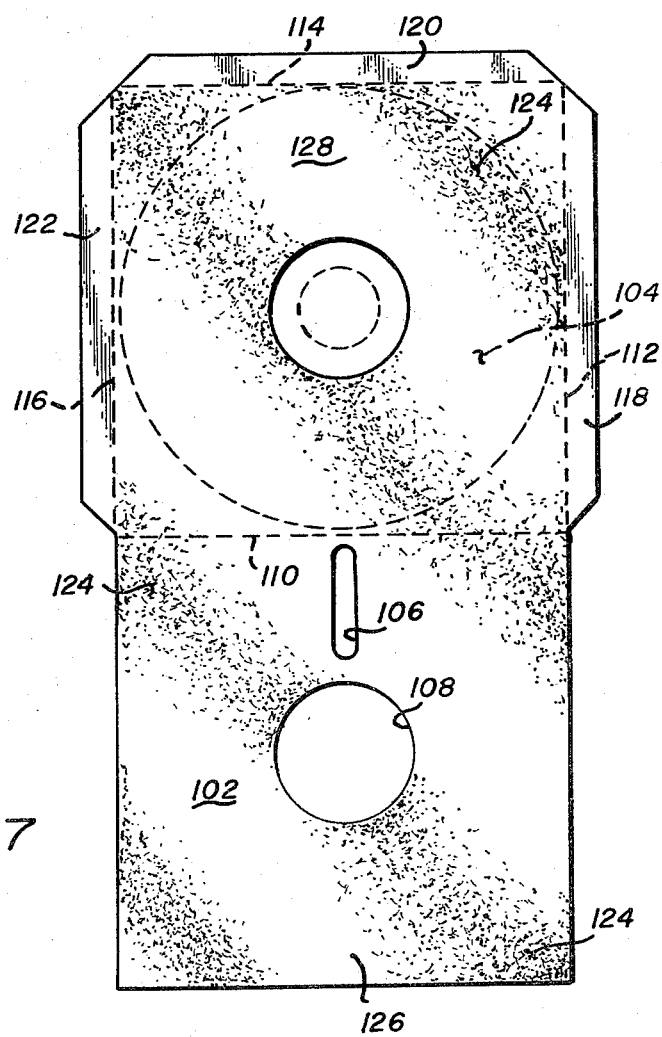
Fig_7

FORMING PROCESS FOR LIGHT GAUGE POLYMER SHEET MATERIAL

BACKGROUND OF THE INVENTION

1. Field of the Invention

The invention relates to a method for providing uniform and warp-free folds in light gauge polymer sheet materials and finds particular application in the manufacture of jackets for flexible magnetic disks.

2. Description of the Prior Art

Flexible magnetic disks of various configurations have been commercially available since the early 1970's. In order that information recorded upon a particular flexible magnetic disk be readable upon a variety of flexible magnetic disk drives, certain standards for disk uniformity and dimensions have been developed. One such standard configuration is the American National Standards Institute (ANSI) X3B8/77-118 (June 27, 1977) specification.

Flexible magnetic disks must operate with certain mechanical and electrical characteristics so that the integrity of the data is maintained. For example, there is a torque specification which requires that the resistance to rotate the flexible magnetic disk within the flexible magnetic disk jacket be within predetermined values. Rotating torques in excess of the specification can create data reliability problems. In addition, the jacket which encloses and protects the flexible magnetic disk must be flat within specified tolerance limits. Jackets which are not flat within the allowable extremes tend to cause excessive torque to rotate the flexible magnetic disk within the jacket and to cause data reliability problems due to head-to-disk contact instability and/or separation. The material from which the flexible magnetic disk jackets have been universally constructed is polyvinyl chloride (PVC).

PVC will meet the technical criteria as a material from which to construct the flexible magnetic disk jacket in accordance with ANSI X3B8/77-118. However, PVC has a deformation or "softening" temperature of approximately 125° F. For applications in which the flexible magnetic disk will be exposed to temperatures in excess of 125° F., the PVC jacket tends to warp and become generally unusable destroying any possibility of recapturing the data stored upon the flexible magnetic disk. For example, military applications often are such that extreme temperatures must be sustained, and PVC has proven unacceptable. It has thus been known for some time that other materials that could withstand higher temperatures without deforming would be desirable to extend the useful operating range of flexible magnetic disks.

A material which is readily available and highly desirable for use as a flexible magnetic disk jacket is a polycarbonate known commonly as Lexan. Lexan polycarbonate has a deformation "softening" temperature of 321° F. It is a much "tougher" material than PVC. However, manufacturers of flexible magnetic disks have been unable to successfully produce a Lexan flexible magnetic disk jacket primarily due to the difficulties in forming light gauge Lexan sheet so that the folded structure of the jacket meets the flatness criteria of ANSI X3B8/77-118. The readily available literature supplied by the General Electric Company, manufacturer of Lexan light gauge polycarbonate sheet material, is wholly inadequate to produce a suitably formed Lexan flexible magnetic disk jacket. Preheating the Lexan sheet as suggested by General Electric and subsequently forming and/or folding such sheets into the desired jacket structure invariably results in a warped jacket that is out of ANSI tolerances Moreover, the available technical literature for forming and/or folding polycarbonate light sheet material does not indicate any practical heating and/or bending fixturing that would aide in achieving a structure useful in the flexible magnetic disk application.

The prior art does describe techniques for producing stress free structures constructed from polymer materials, but such disclosures are generally not applicable to the forming of light gauge polymer sheet materials, especially Lexan polycarbonate. For example, U.S. Pat. No. 3,555,135 issued to Paul describes a method for molding substantially rectilinear-shaped structures from thermoplastic polymers with the improvement being stress relief at the corners of the structures so formed by the localized application of heat. According to the teachings of Paul, heat is applied in a generally uncritical manner to the corner of structures after said structures have been injection molded. The amount of heat applied and the time for application of such heat is sufficient so that the temperature of the polymer is raised to a temperature not exceeding 1° less than the crystalline freeze point of the material from which the structure is molded but not lower than 50° below said crystalline freeze point. While the concept of thermally induced stress relief at the corners of polymer structures is clearly disclosed by Paul, the invention is directed to injection molded parts and not to structures formed from commonly available polymer sheet material. Moreover, Paul does not disclose any details relating to the uniformity with which the heat must be applied to achieve the desired stress relief or the details of any heating or bending fixturing.

U.S. Pat. No. 3,200,182 issued to Hechelhammer et al describes a method for stress relieving a shaped polycarbonate structure. As was true in Paul, the concept of stress relief of a polymer through the use of heat is old in the art. Hechelhammer et al indicates that polycarbonate can be stress relieved if it is subjected for a long period of time to a temperature of from approximately 248° F. to 293° F. (i.e., approximately 120° C. to 145° C.). Hechelhammer et al indicates that approximately one hour of such heat treatment is required per millimeter of wall thickness. As this is practicably unacceptable, Hechelhammer et al teaches the exposure of the polycarbonate article to a temperature of from approximately 572° F. to 2192° F. (i.e., approximately 300° C. to 1200° C.). The exposure to these relatively extremely high temperatures is for a rather short duration. Hechelhammer et al is directed to the rapid stress release of injection molded or extruded polycarbonate structures and contains no teachings which relate to the bending or folding of light gauge polycarbonate sheet material. Moreover, Hechelhammer et al contains no teachings which relate to achieving extreme dimensional stability for a formed or folded structure. Moreover, it has been found in practice that use of temperatures in excess of 375° F. (i.e., 191° C.) cause bubbling of polycarbonate sheets of the Lexan type.

In the specific area of Lexan polycarbonate flexible disk jackets, Memorex Corporation manufactures a model FD-65 flexible magnetic disk with a Lexan jacket. However, this flexible magnetic disk jacket is not folded, but rather the jacket is made from a composite of a plurality of Lexan polycarbonate flat layers. It is also rather expensive to manufacture.

SUMMARY OF THE INVENTION

It is thus an object of the present invention to provide a method whereby polymer sheet materials may be formed and/or folded without introducing excessive bending or warping into the folded or formed structure.

It is another object of the present invention to provide a method for forming and/or folding polymer materials which is both simple to practice, inexpensive, and easy to implement in manufacturing.

It is yet another object of the present invention to provide a method for the forming and/or folding of light gauge Lexan polycarbonate material so as to construct a jacket adapted for a flexible magnetic disk.

The method of the present invention is directed to the practical production of flexible magnetic disks utilizing Lexan polycarbonate jackets. In direct conflict with the prior art, the method of the present invention utilizes light gauge Lexan polycarbonate sheet which is cold-formed about a mandrell plate. Folding bars are utilized to bend and retain the polycarbonate sheet. After bending and without permitting slippage of the polycarbonate sheet material, heat is applied to the corner edge of the bended material. The heat is controlled within tight limits so that the stress relief achieved along the bent and/or formed edge is uniform; a heater bar is provided for actually contacting and heating the folded and/or formed edge of the flexible disk Lexan polycarbonate jacket. In order that stress relief of the folded Lexan polycarbonate jacket is achieved over the entire lengthwise dimension of the folded edge, it is necessary that the folding bars rigidly retain the folded jacket while the heater bar is in contact with the folded edge. The profile of the heater bar which contacts the lengthwise dimension of the folded jacket edge must make intimate contact with said edge, and it has been found effective to use a heater bar profile which is in the shape of a U-shaped channel with planar sidewalls perpendicular to a planar bottom wall.

The time for stress relieving the folded edge of the Lexan polycarbonate flexible disk jacket has been found acceptable when the duration of contact between the heater bar and the folded edge is in the range of 5 to 7 seconds.

It is thus an advantage of the present invention to provide a method whereby a flexible magnetic disk jacket may be constructed from Lexan polycarbonate.

It is another advantage of the present invention to provide a method for folding and/or forming Lexan polycarbonate which does not require preheating of said Lexan polycarbonate sheet material.

It is yet another advantage of the present invention to provide a method for folding and/or forming Lexan polycarbonate which is both inexpensive and easy to implement in the manufacture of flexible magnetic disk jackets.

These and other objects and advantages of the present invention will become apparent to those skilled in the art by referring to the following description of a preferred embodiment and by reference to the several drawing figures.

IN THE DRAWINGS

FIG. 1 is a view of the initial insertion of a Lexan polycarbonate sheet into an apparatus for folding in accordance with the method of the present invention;

FIG. 2 illustrates the Lexan polycarbonate sheet of FIG. 1 in a clamped position;

FIG. 3 illustrates the Lexan polycarbonate sheet of FIG. 1 in a folded condition retained by a folding bar;

FIG. 4 illustrates the method of stress relieving the folded corner by application of heat through a heater bar; and FIG. 5 is an expanded view of detail "A" of FIG. 4.

FIG. 6 is a perspective view of a flexible magnetic disk.

FIG. 7 is a planar view of the preformed jacket of FIG. 6 in an unfolded condition.

DESCRIPTION OF THE PREFERRED EMBODIMENT

The method of the present invention can be applied to various applications in which a relatively flat, warp free folded article constructed from light gauge polymer sheet is desired. In particular, the method has been applied with success to the manufacturer of a Lexan polycarbonate flexible disk jacket. In conformance with ANSI specification X3B8/77-118, the flexible disk jacket has square external dimensions of approximately eight inches on a side with generally perpendicular corners. The manufacturing process of the present invention for the jacket utilizes light gauge Lexan polycarbonate sheet material of 0.010 inch thickness which is preformed with the necessary corners and tabs that will be required in the folding operation. The method of the present invention provides the folding and/or forming procedure in order to achieve a Lexan polycarbonate jacket which meets the flatness or warpage tolerance of the ANSI specifications.

FIGS. 1-4 illustrate application of the method of the present invention to forming a 180° fold into an edge of a flexible magnetic disk jacket constructed from light gauge Lexan sheet material. Referring to FIG. 1, a flat sheet of Lexan polycarbonate 10 is inserted between a rigid base 12 and a folding insert 14. Lexan polycarbonate sheet 10 is inserted so that it is positioned against suitable stops (not shown). The Lexan polycarbonate sheet 10 is generally at room temperature during this insertion.

As shown by the arrow in FIG. 1, folding insert 14 is thereafter urged downward and comes into planar contact with Lexan polycarbonate sheet 10. As illustrated in FIG. 2, Lexan polycarbonate sheet 10 is thereafter held between folding insert 14 and rigid base 12.

Referring to FIG. 3, a folding bar 16, with a top surface 18, thereafter rotates in an upward manner with the surface 18 in contact with the sheet 10. This folds the polycarbonate sheet 10 about folding insert 14. Thereafter, pressure is exerted to the bar 16 so that surface 18 of folding bar 16 rigidly clamps Lexan polycarbonate sheet 10 wrapped about folding insert 14 to rigid base 12. In successfully practicing the method of the present invention, it has been found desirable to cause folding bar 16 to move in an arc where the center of rotation of folding bar 16 is generally about a line 20 as shown in FIG. 3. Line 20 extends along the entire lengthwise edge of the fold.

With Lexan polycarbonate sheet rigidly retained as shown in FIG. 3, it is now necessary to stress relieve the folded corner. Application of heat to the folded corner is utilized for such stress relieving, and FIG. 4 illustrates a heater bar 22 used for this purpose. During the folding operation as illustrated by the FIGS. 1 through 3, heater bar 22 is in a "rest" or disengaged position as shown in phantom in FIG. 4. During the stress relieving operation, heater bar 22 is moved into engagement with the folded edge. Heater bar 22 contacts the folded edge over its entire lengthwise dimension. In a successful application of the method of the present invention, electric heater elements have been utilized (not shown) for inducing the necessary temperature into heater bar 22. Detail A of FIG. 4 is shown in magnified view in FIG. 5 (rigid base 12 and folding bar 16 are not shown in FIG. 5) in order to illustrate the profile of contact between heater bar 22 and the folded edge of Lexan polycarbonate sheet 10.

It has been found in practicing the method of the present invention that intimate contact between heater bar 22 and Lexan polycarbonate sheet 10 is critical. Simple edge contact between heater bar 22 and Lexan polycarbonate sheet 10 has not proven effective.

FIG. 5 illustrates a detailed view of the contact between heater bar 22 and the folded corner of Lexan polycarbonate jacket 10. Lexan polycarbonate jacket 10 has a top surface 24, an edge surface 26, and a bottom surface 28. Heater bar 22 is adapted to contact Lexan polycarbonate jacket 10 along surfaces 24, 26 and 28. Heater bar 22 has a U-shaped trough constructed from a sidewall 30, a sidewall 32, and a bottom wall 34. Sidewalls 30 and 32 meet bottom wall 34 at generally a right angle. The depth of sidewalls 30 and 32 is denoted in FIG. 5 by the letter "d"; the height of bottom wall 34 is similarly denoted in FIG. 5 by the letter "h". In constructing the simple fold shown in FIG. 5, "d" is 0.045 to 0.055 inches and "h" is 0.080 to 0.085 inches. If dimension "d" is significantly smaller than 0.045 inches, proper corner stress release is not achieved. If "d" significantly exceeds 0.055 inches, cosmetic blemishes tend to be impressed into surfaces 24 and 28 of Lexan polycarbonate jacket 10. Likewise, if dimension "h" significantly exceeds 0.085 inches, surfaces 30 and 32 of heater bar 22 will not properly contact surfaces 24 and 28 of Lexan polycarbonate jacket 10. Proper intimate contact between the surfaces noted is a requirement to achieve sufficient stress relief at the corners. If dimension "h" is significantly less than 0.080 inches, then heater bar 22 tends to shear Lexan polycarbonate jacket 10 along the length of folding insert 14.

While the method described above is relatively straightforward, certain factors in practicing the method of the present invention have been found to be important. First, the temperature of heater bar 22 should be preferably maintained within ±2° F. over the entire length of heater bar 22. Further, the temperature of heater bar 22 should be preferably maintained at 375 ±3° F. in order to achieve proper stress relief. In order to achieve such accurate temperature control, use of a proportional temperature controller driving the electrical heater elements has been found to be necessary. Second, heater bar 22 must be kept in contact with Lexan polycarbonate jacket 10 for a sufficient period of time to cause adequate stress relief. The duration of contact between heater bar 22 and Lexan polycarbonate jacket 10 which proves satisfactory has been in the range of five to seven seconds. Contact times between heater bar 22 and Lexan polycarbonate jacket 10 in excess of seven seconds tends to cause the Lexan polycarbonate jacket 10 to bubble and/or warp; contact durations less than five seconds tends to be too short, adequate stress relief is not achieved, and, thus, the Lexan polycarbonate jacket 10 tends to warp due to the residual stresses left in the fold. Third, the contact profile of the heater bar 22 with Lexan polycarbonate jacket 10 is rather important. As shown in FIG. 5, surfaces 30, 32, and 34 within heater bar 22 form a U-shaped channel with perpendicular walls. Experimentation with alternative heater bar contact geometries has proven that alternative designs are less effective if not unacceptable. For example, a circular trough in place of the U-shaped trough has proven unacceptable. Moreover, a semicircular dimple impressed into surface 34 has proven unacceptable. As already noted above, dimensions "d" and "h" for the U-shaped trough must be held rather closely in order not to have adverse effects upon the stress relieving operation. Thus, the geometry, time contact, temperature, and uniformity of the heater bar 22 when in contact with the folded corner are extremely important.

As briefly discussed above, the method of the present invention for folding light gauge Lexan polycarbonate sheet has been successfully applied to the manufacture of flexible magnetic disk jackets. A flexible magnetic disk jacket of the type documented in ANSI X3B8/77-118 is illustrated in perspective in FIG. 6. FIG. 7 illustrates a planar view of the jacket of FIG. 6 in an earlier manufacturing condition wherein the Lexan polycarbonate is precut but still in a flat sheet.

Referring to FIG. 6, a flexible magnetic disk including magnetic media is shown by the general reference character 100. Flexible magnetic disk 100 is basically constructed from a jacket 102 and a flexible magnetic disk 104. Flexible magnetic disk 100 is adapted to be matingly received by a flexible magnetic disk drive (not shown) of the conventional type. Disk 100 has a slotted opening 106 and a central circular opening 108. Opening 106 provides access of a magnetic recording transducer to the disk 104 located within the magnetic recording drive. Opening 108 allows a spindle located within the flexible magnetic disk drive to contact disk 104 and cause said disk 104 to rotate so that the magnetic recording process can be performed.

Jacket 102 of disk 100 is a folded structure with folded edges 110, 112, 114 and 116. Folded edge 110 is a "simple" fold constituting a 180° bend in the Lexan polycarbonate not unlike that described in connection with FIGS. 1 to 5 above. Tabs 118, 120, and 122 are utilized to create edges 112, 114, and 116, respectively.

Referring to FIG. 7, disk 100 is shown with jacket 102 in an unfolded condition. FIG. 7 illustrates disk 104 in phantom inserted into the proper position prior to folding although it is not actually inserted into the jacket until after folded edges 110, 112, and 116 have been formed (described below). FIG. 7 also shows a typical jacket liner 124 attached to the inside of jacket 102. A lint-free fibrous liner 124 is commonly used on the inside of all flexible disks. Liner 124 is heat sealed to the inside of jacket 102 as shown.

FIG. 7 illustrates the four folded edges 100, 112, 114, and 116 as dotted lines. Using the method as described in connection with FIGS. 1 to 5 using a square folding insert 14 with dimensions approximating the locations of edges 110, 112, and 116, edge 110 is folded first. In this manner, a front panel 126 of jacket 102 is folded on top of a rear panel 128 of jacket 102. Thereafter, tabs 118 and 122 are folded on top of front panel 126. Once tabs 118 and 122 are folded, edges 110, 112, and 116 are stress relieved by application of heat from a heater bar in a manner as illustrated in connection with FIGS. 4 and 5. It should be noted that some form of sealing between tabs 118 and 122 and front panel 126 must be employed so as to retain tabs 118 and 122 into bonded contact with front panel 126 after stress relief. In this regard, adhesive sealing for the Lexan polycarbonate has been successfully employed.

Once edges 110, 112, and 116 have been heat stress relieved and tabs 118 and 122 have been sealed to front face 126, the jacket 102 is formed into a "pocket" with an open end. A disk 104 is thereafter inserted, and a folding, stress relief, and sealing operation is performed on tab 120 and edge 114 as was described for edges 112 and 116 and for tabs 118 and 122, respectively. After edge 114 is formed and tab 120 sealed, jacket 102 of disk 100 is ready for electrical and mechanical testing.

In practice, flexible magnetic disks 100 constructed in accordance with the present invention from Lexan polycarbonate jackets 102 have successfully performed at a temperature in excess of 160° F. and a relative humidity in excess of 80°. Such performance is not attainable using jackets 102 constructed from PVC as is known in the prior art.

While for the sake of clarity, and in order to disclose the invention so that the same can be readily understood, a specific embodiment has been described and illustrated, it is to be understood that the present invention is not limited to the specific means disclosed. In may be embodied in other ways that will suggest themselves to persons skilled in the art. It is believed that this invention is new and that all such changes that come within the scope of the following claims are to be considered as part of this invention.

What is claimed is:

1. A method for forming a substantially flat, warp-free flexible magnetic disk jacket assembly from a pre-cut sheet of light gauge polymeric material having wipe material pre-attached to one planar side thereof, comprising the steps of:

clamping a rear panel region of a pre-cut sheet of light gauge polymeric material having wipe material pre-attached to one planar side thereof between a first substantially rigid base and a second substantially rigid square-shaped folding member so that said wipe material is contacted by said substantially rigid folding member, said pre-cut sheet being essentially at room temperature;

folding a front panel region of said sheet over said substantially rigid folding member by means of a first substantially rigid folding bar into a substantially 180° flat fold whereby a first folded edge is formed in said sheet;

retaining said front panel region of said sheet in said folded condition without slippage by means of said first substantially rigid folding bar;

folding a first and a second tab region of said sheet over said front panel region by means of a second and a third substantially rigid folding bar into substantially 180° flat folds whereby a second and a third folded edge are formed in said sheet, said second and third folded edges being formed essentially perpendicularly to and extending from opposite terminal ends of said first folded edge along opposite edges of said rear panel region whereby a pocket is formed between said front panel region and said rear panel region, said pocket being enclosed around its edges by said first, second and third folded edges, said pocket having an open end along an edge of said front panel region opposite to said first folded edge, said open end extending between said terminal ends of said second and said third folded edge furthest from said first folded edge;

retaining said first and second tab regions of said sheet in said folded condition without slippage by means of said second and third substantially rigid folding bar;

applying heat uniformly along said first, second and third folded edges of said sheet by contacting said outer surface of said sheet with a first, a second and a third heated bar having a U-shaped trough adapted to mate with said outer surface of said sheet along said folded edges;

inserting a flexible magnetic disk into said pocket;

folding a third tab region of said sheet over said front panel region by means of a fourth substantially rigid folding bar into a substantially 180° flat fold whereby a fourth folded edge is formed in said sheet, said fourth folded edge being formed essentially perpendicular to said second and third folded edge, extending between said terminal ends of said second and third folded edge furthest from said first folded edge;

retaining said third tab region of said sheet in said folded condition without slippage by means of said fourth substantially rigid folding bar; and applying heat uniformly along said fourth folded edge of said sheet by contacting said outer surface of said sheet with a fourth heated bar having a U-shaped trough adapted to mate with said outer surface of said sheet along said folded edge.

2. The method of claim 1, wherein
said U-shaped trough of said first, second, third, and fourth heated bar has planar side walls perpendicular to a planar bottom wall.

3. The method of claim 1, further comprising the step of:

adhesively sealing said first, second and third tab regions of said pre-cut sheet to said front panel region after folding said tabs and after applying heat uniformly to said first, second, third and fourth folded edge.

4. The method of claims 1 or 2, wherein
said material of said pre-cut sheet is Lexan polycarbonate.

5. The method of claim 4, wherein
said first, second, third and fourth heated bar are maintained generally at a temperature of 375° F.±3° F. with a temperature uniformity end-to-end of ±2° F. and maintained in contact with said folded edges for a duration of approximately five to seven seconds.

* * * * *